Sept. 23, 1969   M. D. ULICH   3,468,568
HUB AND SHAFT SECUREMENT
Filed Sept. 12, 1968

WITNESSES
Helen M. Farkas
James F. Young

INVENTOR
Michael D. Ulich
BY C. C. Young
ATTORNEY

United States Patent Office 3,468,568
Patented Sept. 23, 1969

3,468,568
HUB AND SHAFT SECUREMENT
Michael D. Ulich, Columbus, Ohio, assignor to Westinghouse Electric Corporation, Pittsburgh, Pa., a corporation of Pennsylvania
Filed Sept. 12, 1968, Ser. No. 759,413
Int. Cl. B60b 27/06; F16d 1/06; F16c 3/10
U.S. Cl. 287—53                                    4 Claims

ABSTRACT OF THE DISCLOSURE

A hub and shaft securement arrangement in which a spring clip having a loop portion and a tongue portion is arranged in the hub with the tongue portion squeezed between a flat on the shaft and a flat of the hub so that the free end of the loop is pressed downwardly into a transverse groove in the flat of the shaft, the loop bight projecting from the shaft if necessary.

BACKGROUND OF THE INVENTION

Field of the invention

The invention particularly pertains to the art of securing plastic hubs to shafts.

Description of the prior art

It has been found to be advantageous from a cost standpoint to adopt a fan arrangement for room air conditioners in which the fan and hub are integrally molded of plastic. Typically room air conditioner fans have included metal hubs which have been secured to the shaft of a fan motor by using a set screw. The use of a set screw in a plastic hub is considered unsatisfactory, and the provision of any bushing in the plastic hub would adversely affect the cost advantage.

The provision of fastening means other than set screws has been suggested for fans having plastic hubs, such as in U.S. Patent 3,264,016, and for that matter in connection with a metal hub such as in 2,945,712, and for fastening metal handles onto shafts such as in U.S. Patent 2,718,417. However, those arrangements differ in certain respects from my proposal, which I believe better meets the requirements posed for room air conditioners.

Accordingly, it is an object of my invention to provide a plastic fan hub and metal shaft securement arrangement which is adequate for the intended service, and is relatively inexpensive from the standpoint of both material and labor.

SUMMARY OF THE INVENTION

In accordance with my invention, both the shaft and the hub are provided with flat facing surfaces, the wall of the hub containing the flat having an opening therein, and the flat of the shaft having a cross groove adjacent an end wall of the opening. A spring clip is provided which includes a tongue portion interposed between the flat facing surfaces of the shaft and hub, and a connected loop portion disposed in the hub opening and provided with a free end which is pressed down into the cross groove of the shaft as the shaft is moved into a fully seated position in the hub. In this movement, the shaft engages the tongue portion which is so shaped and disposed relative to the loop portion that the free end of the loop is forced down into the groove as the tongue portion is flattened.

In the currently preferred form, the tongue portion is dished downwardly so that in its interposed final position it is tended to be flattened which in turn pivots the loop portion slightly to press the free end of the loop into the cross groove. Further, for facilitating the assembly operation of hub to shaft, one leg of the loop portion has a bent-out tab spaced from the tongue portion to receive one end wall of the hub opening between the tab and the tongue to stabilize the spring clip during the assembly.

DRAWING DESCRIPTION

DESCRIPTION OF THE PREFERRED EMBODIMENT

Figure 1:
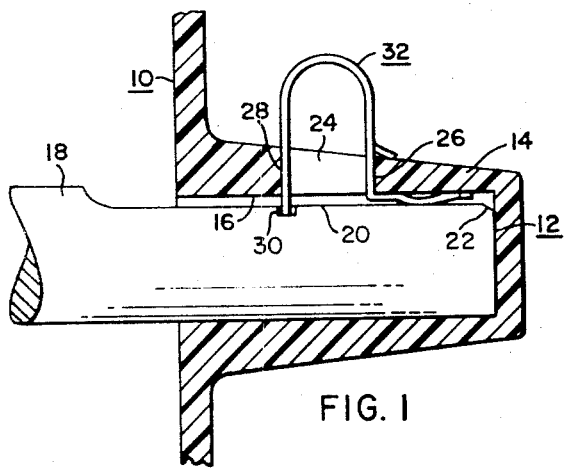
FIGURE 1 is a fragmentary, vertical sectional view taken through the fan hub, shaft and clip, and generally corresponding to a section taken along the line I—I of FIG. 2.
Figure 2:
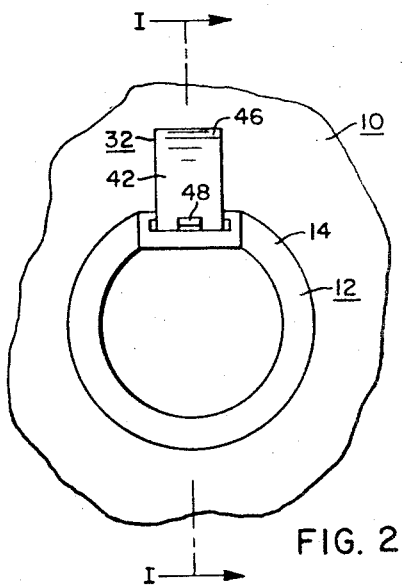
FIG. 2 is a framentary face view of the assembly.

The plastic fan in connection with which the invention will be explained is of a generally propellor type and includes a plate portion 10 from which the blades (not shown) extend radially outwardly, and a cylindrical hub 12 which is formed as an integral part of the fan as a whole. While the hub is generally cylindrical, at least one wall 14 is provided with a flat surface on at least its inner face 16.

The shaft 18 which drives the fan wheel includes an end portion received within the hub 12 which also includes a flat side 20 and is preferably provided with a chamfer 22 at the end of the flat.

The flat side wall 14 of the hub includes an opening 24 therein, the opening being defined at its front by the thickness of the flat wall edge 26 and at its rear by the thickness of the flat wall edge 28. The flat side 20 of the shaft is provided with a groove 30 transverse to the axis of the shaft which, when the shaft is fully inserted into the hub, lies in a plane coincident with the space immediately adjacent the end wall 28 of the hub opening.

Figure 3:
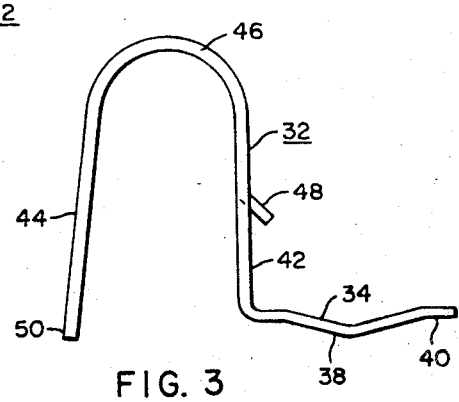
FIG. 3 is an enlarged edge view of the spring clip alone.

The currently preferred form of the spring clip 32 is probably best seen in its detail in FIG. 3. The main parts of the clip include a tongue portion 34, and a loop or U-shaped portion 32. The tongue portion 34 includes a downwardly-dished center portion 38, a generally flat forward portion 40, and an opposite end portion which is connected to one leg 42 of the loop portion. The loop portion also includes an opposite leg 44, and a bight 46. The leg 42 includes a bent-out tab 48 which is spaced from the tongue portion a distance corresponding generally to the thickness of the hub flat side wall 14.

The relationship of the hub, shaft, and spring-clip in the finally assembled form is illustrated in FIG. 1. As may be there seen, the tongue portion 34 is interposed between the facing flats of the shaft and hub, while the U-shaped or loop portion 36 is disposed in the aperture 24 in the hub with the bight 46 extending out of the hub. The bottom or free end 50 of the leg called the opposite leg 44 is pressed down into the transverse groove 30 of the shaft. The technique of assembling these parts will be best understood in connection with FIG. 4.

Figure 4:
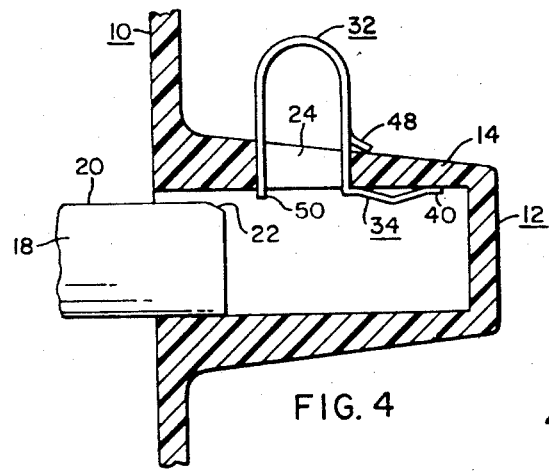
FIG. 4 is a fragmentary view similar to FIG. 1 but illustrating the spring clip placed in the hub before the shaft is forced into the hub.

First the clip 32 is mounted to the hub by inserting the tongue portion 34 down through the aperture 24 in the hub, then squeezing the legs of the loop portion slightly together so that the end 50 of the loop portion can be inserted into the aperture, and rotating the clip in a counterclockwise direction (as seen in FIG. 4) until the tab 48 seats against the outer face of the flat side 14 of the hub, with the tongue 34 underlying the flat side of the hub, and with the free end 50 in about the location shown in FIG. 4. The span of the legs of the loop portion is slightly greater than the distance between the walls 26 and 28 forming the aperture in the hub flat side wall so that with the clip as shown in FIG. 4, the marginal end portions of the legs bear against these walls 26 and 28. It has been found that the placement of the clip in the hub is not particularly critical with the arrangement according to the invention since if the free end 50 of the one leg of the loop projects below the innerface of the flat wall 14 of the hub, it will be forced upwardly and out of the way by the chamfer edge 22 of the shaft when the shaft is inserted.

The shaft is inserted into the hub from the position as shown in FIG. 4 with the chamfer 22 engaging the tongue portion 34 of the clip spring first and then as the shaft is pushed further forwardly, the flat side 20 of the shaft engages the dished-down portion of the tongue and tends to flatten it. This flattening force upon the spring clip tends to rotate the loop to a slight degree in a counter-clockwise direction (FIG. 4 view), and as the groove 30 on the shaft flat moves into a position in which the free end 50 of the loop can be pressed down into the groove, the groove receives the end 50. The free end is held in this pressed-down position by virtue of the flat of the shaft continuing to tend to flatten the tongue portion 34. Accordingly, the clip prevents the axial disengagement of the shaft from the hub. To remove the shaft from the hub, a narrow instrument such as a screwdriver may be inserted in the exposed bight portion of the loop and lifted slightly to pull the free end of the leg 44 up out of the groove, the shaft then simply being slipped out of the hub in a rearward direction.

It will be appreciated that certain variations in the illustrated arrangement may be made without departing from the scope of the invention. For example, the tab 48 may be eliminated and the clip will still perform satisfactorily, although it has been found that it makes the assembly somewhat more difficult since the clip may tend to be pushed down into the hub too far and thereby place the end 50 of the leg 44 in the way of the advancing end of the shaft. Also, the tongue portion may be made without the dished portion and simply extend at a downwardly directed diagonal relative to a plane passing through the bottom ends of the legs, but this makes it more difficult to remove the shaft from the hub. Accordingly, the details of the arrangement as illustrated are currently preferred.

I claim:
1. A hub and shaft securement arrangement including:
   a shaft having a flat surface on one side;
   a hub mounted on said shaft, said hub including one wall providing an interior flat surface facing said shaft flat;
   a cross groove in said shaft flat;
   an opening in said one wall of said hub;
   a spring clip including a generally U-shaped portion and a tongue portion, said U-shaped portion including one leg and an opposite leg and a bight portion, said tongue portion extending from the bottom end of said one leg and being interposed between the facing flat surfaces of said shaft and hub, said U-shaped portion being disposed in said hub opening with the bight thereof projecting exteriorly of the hub in the finally assembled relation of hub and shaft, said tongue portion being disposed relative to said U-shaped portion so that with said tongue portion being in said interposed position between said facing flats, the free end of said opposite leg of said U-shaped portion is forced down in said cross groove to prevent axial disengagement of said hub from said shaft, said one leg includes a tab projecting therefrom at a distance from said tongue generally corresponding to the thickness of the end wall of the hub opening, and the intervening portion of said one leg along with said tab and tongue forms a seat receiving the end wall of said hub opening for stabilizing said spring clip during assembly of said hub and shaft, with the marginal end portion of said opposite leg bearing against the opposite wall of said hub opening.

2. An arrangement according to claim 1:
said tongue portion in unstressed condition has a generally downwardly-dished shape in longitudinal section and is subject to being deflected toward a more flattened shape in said interposed position between said hub and said shaft flats, to effect the pressing of said free end of said opposite leg into said groove.

3. An arrangement according to claim 2 wherein:
said downwardly-dished shape includes a substantially planar end portion.

4. A fan and shaft attachment arrangement comprising:
   a plastic fan having an integrally formed hub defining an inner generally cylindrical bore with at least one flat side, said flat side being provided with an opening therein spaced from the end of said hub;
   a shaft end onto which said hub is received, said shaft end having a cross-sectional shape generally conforming to the cross-sectional shape of said bore and including a flat side, said shaft end flat side including a cross groove formed therein and registering with the inboard end wall of said hub opening when said hub is fully received on said shaft end;
   a spring clip for securing said hub to said shaft and against relative axial movement therebetween, said clip including a loop portion and a tongue portion, said loop portion being disposed in said opening with the bight of the loop exposed exteriorly of the hub and the free end of said loop projecting down into said groove, the tongue of said clip being disposed between the flat of said shaft and the innerface of the flat of said hub;
   one leg of said loop including a tab projecting therefrom at a distance from said tongue generally corresponding to the thickness of the end wall of the hub opening, and the intervening portion of said one leg along with said tab and tongue forms a seat receiving the end wall of said hub opening for stabilizing said spring clip during assembly of said hub and shaft, with the marginal end portion of said opposite leg bearing against the opposite wall of said hub opening;
   the general plane of said tongue being related to the disposition of said loop to cause said loop to be pivoted to press said free end of said loop down into said groove as said shaft end is fully received in said hub with said tongue being positioned between said flat sides of said hub and shaft.

References Cited

UNITED STATES PATENTS 2,718,417   9/1955   Hansen.
2,774,852   12/1956  Boardman.
2,945,712   7/1960   Lewis.

CARL W. TOMLIN, Primary Examiner

A. V. KUNDRAT, Assistant Examiner

U.S. Cl. X.R.

74—548; 292—353